United States Patent

Casavan

(10) Patent No.: US 9,872,591 B2
(45) Date of Patent: Jan. 23, 2018

(54) HEATED ICE SCRAPER ASSEMBLY

(71) Applicant: Scott Casavan, Thief River Falls, MN (US)

(72) Inventor: Scott Casavan, Thief River Falls, MN (US)

( * ) Notice: Subject to any disclaimer, the term of this patent is extended or adjusted under 35 U.S.C. 154(b) by 113 days.

(21) Appl. No.: 14/944,752

(22) Filed: Nov. 18, 2015

(65) Prior Publication Data

US 2017/0135538 A1    May 18, 2017

(51) Int. Cl.
| | |
|---|---|
| *H05B 1/02* | (2006.01) |
| *A47L 1/16* | (2006.01) |
| *B08B 1/00* | (2006.01) |
| *B25G 1/00* | (2006.01) |
| *B60S 3/04* | (2006.01) |

(52) U.S. Cl.
CPC ............... *A47L 1/16* (2013.01); *B08B 1/005* (2013.01); *B25G 1/00* (2013.01); *B60S 3/045* (2013.01)

(58) Field of Classification Search
CPC A47L 1/16; B08B 1/005; B08B 13/00; B25G 1/00; H05B 1/0231; H05B 3/0042; H05B 1/02
USPC ....... 219/201, 202, 494, 497, 203, 228, 229, 219/233, 237
See application file for complete search history.

(56) References Cited

U.S. PATENT DOCUMENTS

| | | | | |
|---|---|---|---|---|
| 2,636,264 | A * | 4/1953 | Ganzer | B26B 21/40 30/41 |
| 3,339,608 | A * | 9/1967 | Brenner | B26B 29/00 150/162 |
| 3,711,679 | A | 1/1973 | Moschkau et al. | |
| 5,357,646 | A * | 10/1994 | Kim | A47L 1/16 15/111 |
| 5,973,294 | A * | 10/1999 | Schatt | A47L 1/16 219/228 |
| 6,969,828 | B2 * | 11/2005 | Deane, III | E05B 17/0016 219/227 |
| D652,593 | S | 1/2012 | Wu | |
| 9,345,314 | B2 * | 5/2016 | Henningsen | A46B 5/005 |
| 2006/0282980 | A1 * | 12/2006 | Subramanian | A47L 1/16 15/401 |
| 2011/0099742 | A1 * | 5/2011 | Venalainen | A47L 1/16 15/236.02 |

FOREIGN PATENT DOCUMENTS

WO    WO03066396    8/2003

\* cited by examiner

*Primary Examiner* — Mark Paschall

(57) ABSTRACT

A heated ice scraper assembly includes a scraper that has a handle and a wedge. The handle may be manipulated thereby facilitating the wedge to scrape ice from a window. A blade is coupled to the wedge and the blade may frictionally engage the ice thereby facilitating the ice to be removed from the window. A cover is selectively positioned on the blade. A heating unit is coupled to the scraper and the heating unit is in thermal communication with the blade. The heating unit heats the blade thereby enhancing the scraping ice with the blade.

7 Claims, 3 Drawing Sheets

HEATED ICE SCRAPER ASSEMBLY

BACKGROUND OF THE DISCLOSURE

Field of the Disclosure

The disclosure relates to scraper devices and more particularly pertains to a new scraper device for utilizing a heated blade to remove ice from a window.

SUMMARY OF THE DISCLOSURE

An embodiment of the disclosure meets the needs presented above by generally comprising a scraper that has a handle and a wedge. The handle may be manipulated thereby facilitating the wedge to scrape ice from a window. A blade is coupled to the wedge and the blade may frictionally engage the ice thereby facilitating the ice to be removed from the window. A cover is selectively positioned on the blade. A heating unit is coupled to the scraper and the heating unit is in thermal communication with the blade. The heating unit heats the blade thereby enhancing the scraping ice with the blade.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
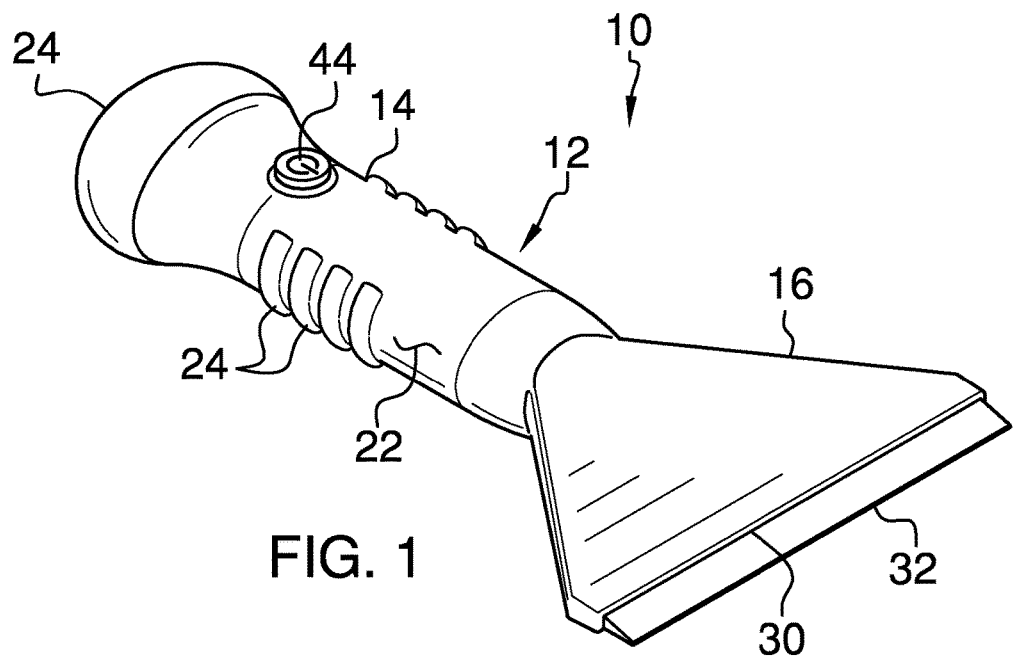
FIG. 1 is a perspective view of a heated ice scraper assembly according to an embodiment of the disclosure.
Figure 2:
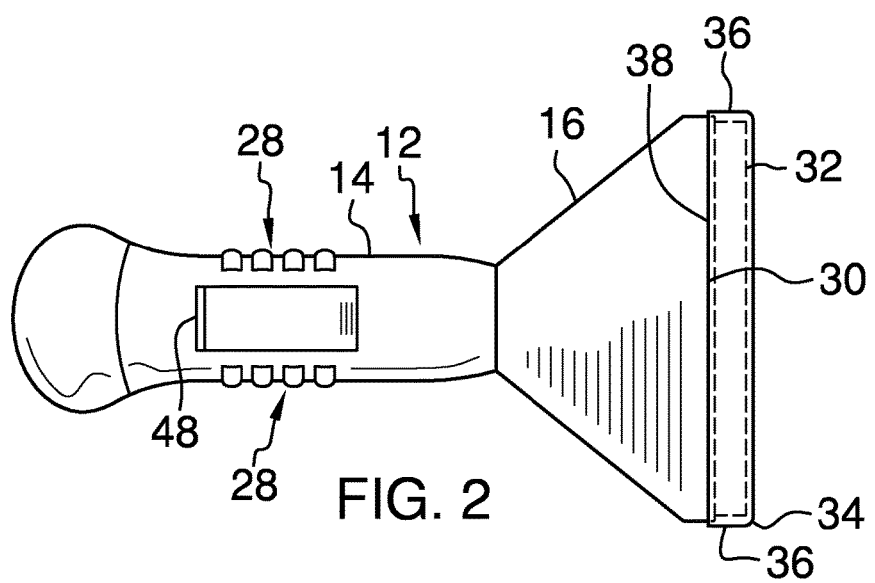
FIG. 2 is a bottom view of an embodiment of the disclosure.
Figure 3:
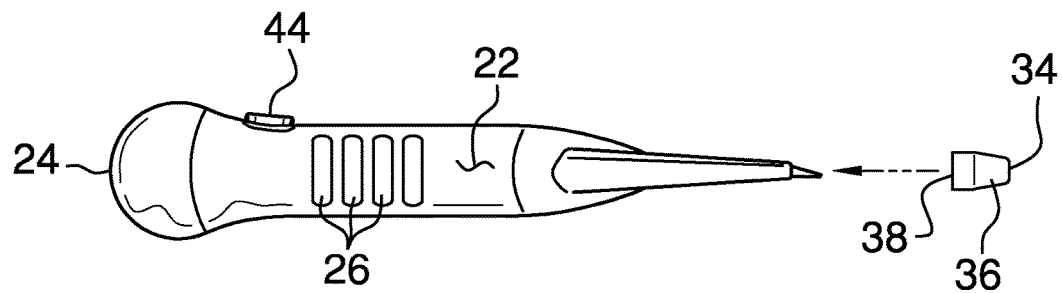
FIG. 3 is a right side view of an embodiment of the disclosure.
Figure 4:
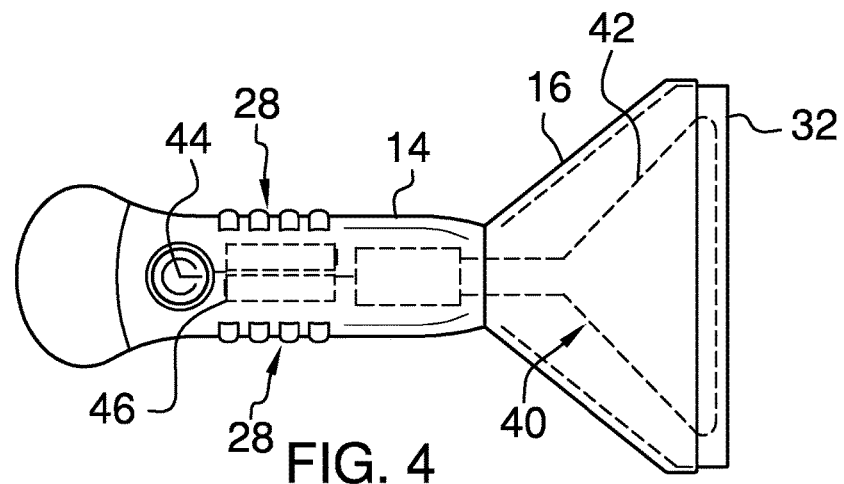
FIG. 4 is a top view of an embodiment of the disclosure.
Figure 5:
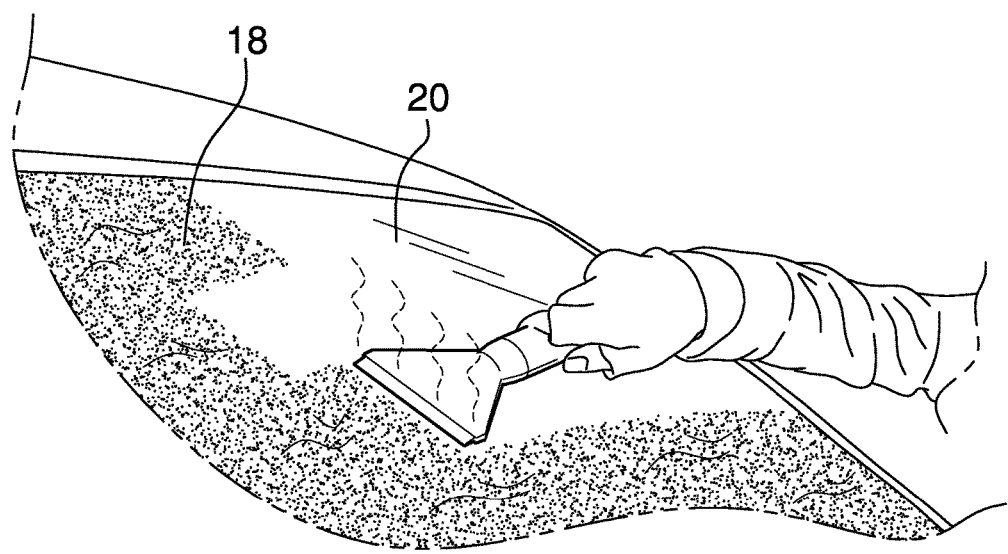
FIG. 5 is a perspective in-use view of an embodiment of the disclosure.

With reference now to the drawings, and in particular to FIGS. 1 through 5 thereof, a new scraper device embodying the principles and concepts of an embodiment of the disclosure and generally designated by the reference numeral 10 will be described.

As best illustrated in FIGS. 1 through 5, the heated ice scraper assembly 10 generally comprises a scraper 12 that has a handle 14 and a wedge 16. The handle 14 may be manipulated thereby facilitating the wedge 16 to scrape ice 18 from a window 20. The window 20 may a windshield on a vehicle or the like. The vehicle may be a passenger vehicle.

The handle 14 has an outer surface 22 and a distal end 24 with respect to the wedge 16. The handle 14 is substantially hollow. The outer surface 22 curves outwardly toward the distal end 24. Thus, the distal end 24 forms a bulb thereby enhancing gripping the handle 14.

A plurality of grips 26 is provided and each of the grips 26 is coupled to the outer surface 22. The grips 26 are spaced apart from each other and distributed between the wedge 16 and the distal end 24. The plurality of grips 26 is divided into a pair of sets of grips 28. Each of the sets of grips 28 is positioned on opposite sides of the handle 14.

The wedge 16 has a distal end 30 with respect to the handle 14. The wedge 16 flares outwardly between the handle 14 and the distal end 30 corresponding to the wedge 16. Thus, the distal end 30 corresponding to the wedge 16 has a width that is greater than a width of the handle 14. The wedge 16 may have a width ranging between approximately ten cm and fifteen cm.

A blade 32 is coupled to the wedge 16. The blade 32 frictionally engages the ice 18 thereby facilitating the ice 18 to be removed from the window 20. The blade 32 is positioned on the distal end 30 of the wedge 16 and the blade 32 is substantially coextensive with the distal end 30 of the wedge 16. The blade 32 is comprised of a thermally conductive material. The blade 32 is additionally comprised of a rigid material.

A cover 34 is selectively positioned on the blade 32. The cover 34 has a pair of ends 36 and a back side 38. The cover 34 is elongated between the ends 36. The back side 38 is open such that the back side 38 insertably receives the blade 32.

A heating unit 40 is coupled to the scraper 12. The heating unit 40 is in thermal communication with the blade 32. Thus, the heating unit 40 heats the blade 32 thereby enhancing scraping the ice 18 with the blade 32. The heating unit 40 comprises a heating coil 42 that is positioned within the wedge 16. The heating coil 42 extends into the blade 32 such that the heating coil 42 is in thermal communication with the blade 32.

The heating coil 42 selectively heats the blade 32. Thus, the heating coil 42 may melt the ice 18 when the blade 32 frictionally engages the ice 18. The heating coil 42 may comprise an electrical heating coil or the like. The heating coil 42 may have an operational temperature ranging between approximately eighty degrees Fahrenheit and one hundred degrees Fahrenheit.

A switch 44 is coupled to the handle 14 and the switch 44 may be manipulated. The switch 44 is positioned on the outer surface 22. The switch 44 is electrically coupled to the heating coil 42 such that the switch 44 turns the heating coil 42 on and off. The switch 44 may be positioned between the grips 26 and the distal end 24 of the handle 14.

A power supply 46 is positioned within the handle 14. The power supply 46 is electrically coupled to the switch 44 and the power supply 46 comprises at least one battery. A battery cover 48 is removably coupled to the handle 14. The power supply 46 is positioned beneath the battery cover 48 thereby facilitating the power supply 46 to be removed from the handle 14.

In use, the cover 34 is removed from the blade 32 and the switch 44 is manipulated to turn the heating coil 42 on. The handle 14 is manipulated such that the blade 32 frictionally engages the ice 18 on the window 20. The handle 14 is manipulated such that the blade 32 moves across the window 20. The blade 32 melts the ice 18 and the blade 32 scrapes the ice 18 from the window 20. The heating coil 42 enhances removing the ice 18 from the window 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated ice scraper assembly comprising:
    a scraper having a handle and a wedge, said handle being configured to be manipulated thereby facilitating said wedge to scrape ice from a window;
    a blade being coupled to said wedge wherein said blade is configured to frictionally engage the ice thereby facilitating the ice to be removed from the window;
    a cover being selectively positioned on said blade; and
    a heating unit being coupled to said scraper, said heating unit being in thermal communication with said blade wherein said heating unit is configured to heat said blade thereby enhancing said scraping ice with said blade, said heating unit comprising a heating coil being positioned within said wedge, said heating coil extending into said blade such that said heating coil is in thermal communication with said blade, said heating coil selectively heating said blade wherein said heating coil is configured to melt the ice when said blade frictionally engages the ice.

2. The assembly according to claim 1, wherein said handle has an outer surface and a distal end with respect to said wedge, said handle being substantially hollow, said wedge having a distal end with respect to said handle, said wedge flaring outwardly between said handle and said distal end corresponding to said wedge such that said distal end corresponding to said wedge has a width being greater than said handle.

3. The assembly according to claim 2, wherein said blade is positioned on said distal end of said wedge, said blade being substantially coextensive with said distal end of said wedge, said blade being comprised of a thermally conductive material.

4. The assembly according to claim 1, wherein said cover has a pair of ends and a back side, said cover being elongated between said ends, said back side being open such that said back side insertably receives said blade.

5. The assembly according to claim 1, further comprising a switch being coupled to said handle wherein said switch is configured to be manipulated, said switch being positioned on said outer surface, said switch being electrically coupled to said heating coil such that said switch turns said heating coil on and off.

6. The assembly according to claim 5, wherein a power supply being positioned within said handle, said power supply being electrically coupled to said switch, said power supply comprising at least one battery.

7. A heated ice scraper assembly comprising:
    a scraper having a handle and a wedge, said handle being configured to be manipulated thereby facilitating said wedge to scrape ice from a window, said handle having an outer surface and a distal end with respect to said wedge, said handle being substantially hollow, said wedge having a distal end with respect to said handle, said wedge flaring outwardly between said handle and said distal end corresponding to said wedge such that said distal end corresponding to said wedge has a width being greater than said handle;
    a blade being coupled to said wedge wherein said blade is configured to frictionally engage the ice thereby facilitating the ice to be removed from the window, said blade being positioned on said distal end of said wedge, said blade being substantially coextensive with said distal end of said wedge, said blade being comprised of a thermally conductive material;
    a cover being selectively positioned on said blade, said cover having a pair of ends and a back side, said cover being elongated between said ends, said back side being open such that said back side insertably receives said blade; and
    a heating unit being coupled to said scraper, said heating unit being in thermal communication with said blade wherein said heating unit is configured to heat said blade thereby enhancing said scraping ice with said blade, said heating unit comprising:
        a heating coil being positioned within said wedge, said heating coil extending into said blade such that said heating coil is in thermal communication with said blade, said heating coil selectively heating said blade wherein said heating coil is configured to melt the ice when said blade frictionally engages the ice,
        a switch being coupled to said handle wherein said switch is configured to be manipulated, said switch being positioned on said outer surface, said switch being electrically coupled to said heating coil such that said switch turns said heating coil on and off, and
        a power supply being positioned within said handle, said power supply being electrically coupled to said switch, said power supply comprising at least one battery.

* * * * *